(12) United States Patent
Wang et al.

(10) Patent No.: US 12,053,943 B2
(45) Date of Patent: Aug. 6, 2024

(54) METHOD FOR REPAIRING COMPOSITE STRUCTURES USING FOAMABLE MEDIA

(71) Applicant: The Boeing Company, Chicago, IL (US)

(72) Inventors: Xiaoxi Wang, Mukilteo, WA (US); Gary E. Georgeson, Tacoma, WA (US)

(73) Assignee: THE BOEING COMPANY, Arlington, VA (US)

( * ) Notice: Subject to any disclaimer, the term of this patent is extended or adjusted under 35 U.S.C. 154(b) by 217 days.

(21) Appl. No.: 17/370,375

(22) Filed: Jul. 8, 2021

(65) Prior Publication Data

US 2023/0011358 A1   Jan. 12, 2023

(51) Int. Cl.
| | |
|---|---|
| *B29C 73/10* | (2006.01) |
| *B29C 73/30* | (2006.01) |
| *B29L 31/30* | (2006.01) |
| *B64F 5/40* | (2017.01) |

(52) U.S. Cl.
CPC .............. *B29C 73/10* (2013.01); *B29C 73/30* (2013.01); *B64F 5/40* (2017.01); *B29L 2031/3076* (2013.01)

(58) Field of Classification Search
CPC . B29C 73/10; B29C 73/30; B29L 2031/3076; B64F 5/40
See application file for complete search history.

(56) References Cited

U.S. PATENT DOCUMENTS

| | | | |
|---|---|---|---|
| 9,015,941 B2 | 4/2015 | Thiagarajan et al. | |
| 9,849,656 B2 | 12/2017 | Wardlaw et al. | |
| 2004/0028877 A1* | 2/2004 | Itoh | B29C 73/26 |
| | | | 428/118 |
| 2009/0269547 A1 | 10/2009 | Meyer et al. | |
| 2016/0101878 A1* | 4/2016 | Wardlaw | B32B 43/00 |
| | | | 416/229 R |
| 2020/0207033 A1* | 7/2020 | Wang | B29C 33/3821 |
| 2020/0398507 A1* | 12/2020 | Mishra | B29C 73/00 |
| 2021/0001519 A1 | 1/2021 | Wang et al. | |

OTHER PUBLICATIONS

Extended European Search Report issued Nov. 29, 2022 in corresponding European Application No. 22182984.9, 7 pages.
Georgeson et al., "System and Method of Fabricating Sandwich Panels With a Foamable Material," U.S. Appl. No. 16/796,365.

* cited by examiner

*Primary Examiner* — George R Koch
(74) *Attorney, Agent, or Firm* — MH2 Technology Law Group LLP

(57) ABSTRACT

A method for repairing a composite structure, includes creating a repair cavity in a composite structure, placing foamable media in the repair cavity, placing a replacement skin over the repair cavity, and expanding the foamable media placed in the repair cavity.

20 Claims, 10 Drawing Sheets

METHOD FOR REPAIRING COMPOSITE STRUCTURES USING FOAMABLE MEDIA

TECHNICAL FIELD

The present disclosure generally relates to repair methods for composite structures, such as composite sandwich and composite laminate structures, and more particularly, to methods for repairing composite structures using expandable foamable media.

BACKGROUND

Composite structures used for aerospace applications can include composite sandwich and composite laminate structures. Composite sandwich structures or panels generally include a low-density core sandwiched between two face sheets of material having a high tensile and compression strength. For example, low-density cores can include paper, metal, or composite honeycomb cores and solid or machined foam cores, and the face sheets can include layers of metal, composite, fiberglass, or ceramic materials. The low-density cores can form a plurality of cells, such as an array of honeycomb cells typical of honeycomb cores. Composite laminate structures use multiple layers of composite materials, such as resin-impregnated carbon fiber-reinforced plies, to create a composite structure. Generally, composite laminate structures include many more plies of composite material than that used for the face sheets of a composite sandwich panel.

However, the repair of composite structures, such as composite sandwich panels and composite laminate structures, often requires very time-intensive, complex, and manually demanding repair processes by highly trained personnel that are often in short supply. For example, a scarfed repair on a composite laminate structure often requires precise removal of material surrounding the damaged area, using precision sanding and/or milling operations. This is followed by application of an adhesive to the scarfed surface, placing a composite laminate patch within the damaged area, and then curing the composite laminate patch to bond it to the composite structure. For a repair on a composite sandwich panel, the skin above the damaged area is typically cut out and removed, the damaged core also cut out and replaced, and then a new skin is bonded to the core. A simple external "doubler" composite or metal patch can be laid up and/or bonded over damaged composite laminate or honeycomb structures, but the "doubler" patch often protrudes above an exterior of the composite structure, which may be undesirable for aesthetic or aerodynamic reasons. These repair processes are often manually intensive and can take a long time to accomplish. Accordingly, there is a need for methods for repairing composite structures that are simpler, faster, and can be more portable. In particular, methods that avoid or minimize removal of material during the repair process and approaches that can partially or fully restore properties of the damaged composite structures to reduce the overall time, complexity, and cost of the repair.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a method for repairing a composite structure, comprising: creating a repair cavity in a composite structure; placing foamable media in the repair cavity; placing a replacement skin over the repair cavity; and expanding the foamable media placed in the repair cavity, wherein the foamable media comprises a polymer matrix configured to hold a foaming agent, wherein the polymer matrix comprises one or more of a thermoset polymer, a thermoplastic polymer, or combinations thereof, wherein the foaming agent comprises one or more of a physical foaming agent, a chemical foaming agent, or combinations thereof, and wherein the foamable media is configured to expand according to a predetermined change in condition or triggering event.

The method further comprises at least one of: placing a caul plate over the repair cavity, removing excess foamable media, and sealing the composite structure.

Creating a repair cavity in a composite structure comprises: detecting a damaged area in the composite structure; removing at least a portion of an external skin corresponding to the damaged area in the composite structure; and removing material from the composite structure corresponding to the damaged area to define the repair cavity, wherein removing material from the composite structure comprises removing at least one of dust, debris, or contaminants from the repair cavity.

The foamable media comprises at least one of a plurality of expandable pellets comprising the polymer matrix holding the foaming agent or a wet foam comprising a multi-part system that is mixed together to activate foaming and expand, and, wherein the foamable media comprises reinforcing fibers comprising at least one of carbon fibers, fiberglass fibers, aramid fibers, polyester fibers, hemp fibers, wood fibers, or combinations thereof.

The foamable media comprises two or more foamable media, and wherein placing foamable media in the repair cavity comprises placing two or more foamable media in the repair cavity.

At least one of the two or more foamable media comprises a flexible film, wherein the flexible film is adhesive and configured to bond the two or more foamable media together, and wherein the flexible film comprises at least one of a thermoplastic elastomers (TPE), silicon, natural rubber, natural or synthetic latex, polyethylene (PE), or combinations thereof.

Placing foamable media in the repair cavity further comprises placing one or more septum in the repair cavity, and wherein at least one of the one or more septum is placed between the two or more foamable media.

At least one of the two or more foamable media has a different functional characteristic than the rest of the two or more foamable media.

The foamable media comprises two or more layers of foamable media, and wherein placing foamable media in the repair cavity comprises placing two or more layers of foamable media in the repair cavity.

Placing foamable media in the repair cavity further comprises placing one or more septum in the repair cavity, wherein at least one of the one or more septum is placed between the two or more layers of foamable media.

At least one of the two or more layers of foamable media has a different functional characteristic than the rest of the two or more layers of foamable media.

Placing foamable media in the repair cavity comprises placing one or more adhesive layers in the repair cavity, wherein the one or more adhesive layers bond the foamable media to at least one of the repair cavity or the replacement skin, and wherein the one or more adhesive layers comprise at least one of an epoxy resin, an epoxy film, a paste, a glue, a plastic film, or combinations thereof.

Placing foamable media in the repair cavity comprising placing one or more adhesive layers between the two or more foamable media.

Placing foamable media in the repair cavity comprises placing one or more adhesive layers between the two or more foamable media and the one or more septum.

The method further comprises placing a caul plate over the repair cavity, wherein placing a replacement skin over the repair cavity comprises bonding the replacement skin to the external skin, and wherein expanding the foamable media placed in the repair cavity comprises using at least one of the replacement skin and the caul plate to apply a pressure on the foamable media during expansion.

The foregoing and/or other aspects and utilities exemplified in the present disclosure may also be achieved by providing a method for repairing a composite structure comprising: creating a repair cavity in the composite structure; placing foamable media in the repair cavity; and expanding the foamable media placed in the repair cavity, wherein the composite structure comprises a composite sandwich panel including a core disposed between two face sheets, and wherein the core defines a plurality of hollow cells, and wherein the foamable media comprises a polymer matrix configured to hold a foaming agent, wherein the polymer matrix comprises one or more of a thermoset polymer, a thermoplastic polymer, or combinations thereof, wherein the foaming agent comprises one or more of a physical foaming agent, a chemical foaming agent, or combinations thereof, and wherein the foamable media is configured to expand according to a predetermined change in condition or triggering event.

The method further comprises removing excess foamable media and sealing the composite structure.

Creating a repair cavity in the composite structure comprises: detecting a damaged area in the composite structure; creating one or more access holes and one or more vent holes in the composite structure; and removing portions of the composite structure through the one or more access holes or the one or more vent holes to create the repair cavity.

Placing foamable media in the repair cavity comprises placing two or more layers of foamable media in the repair cavity 160, and wherein at least one of the two or more layers of foamable media has a different functional characteristic than the rest of the two or more layers of foamable media.

Removing portions of the composite structure through the one or more access holes or the one or more vent holes to create the repair cavity comprises inserting a foamable media injection tube into the core through the one or more access holes to create one or more channels within the core, and wherein the one or more channels penetrate at least one of the plurality of hollow cells.

Removing portions of the composite structure through the one or more access holes or the one or more vent holes to create the repair cavity comprises inserting a rotating chopping tool into the core through the one or more access holes to create the repair cavity 160.

Placing foamable media in the repair cavity comprises placing foamable media in the repair cavity through at least one of the one or more access holes or the one or more vent holes.

At least one of the plurality of hollow cells is damaged or crushed, and wherein expanding the foamable media placed in the repair cavity comprises expanding the foamable media into at least one damaged or crushed cell and at least partially restoring a shape or volume of the at least one damaged or crushed cell when the foamable media is expanded.

Expanding the foamable media placed in the repair cavity comprises sealing the one or more access holes and the one or more vent holes to apply a pressure on the foamable media during expansion.

Further areas of applicability will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
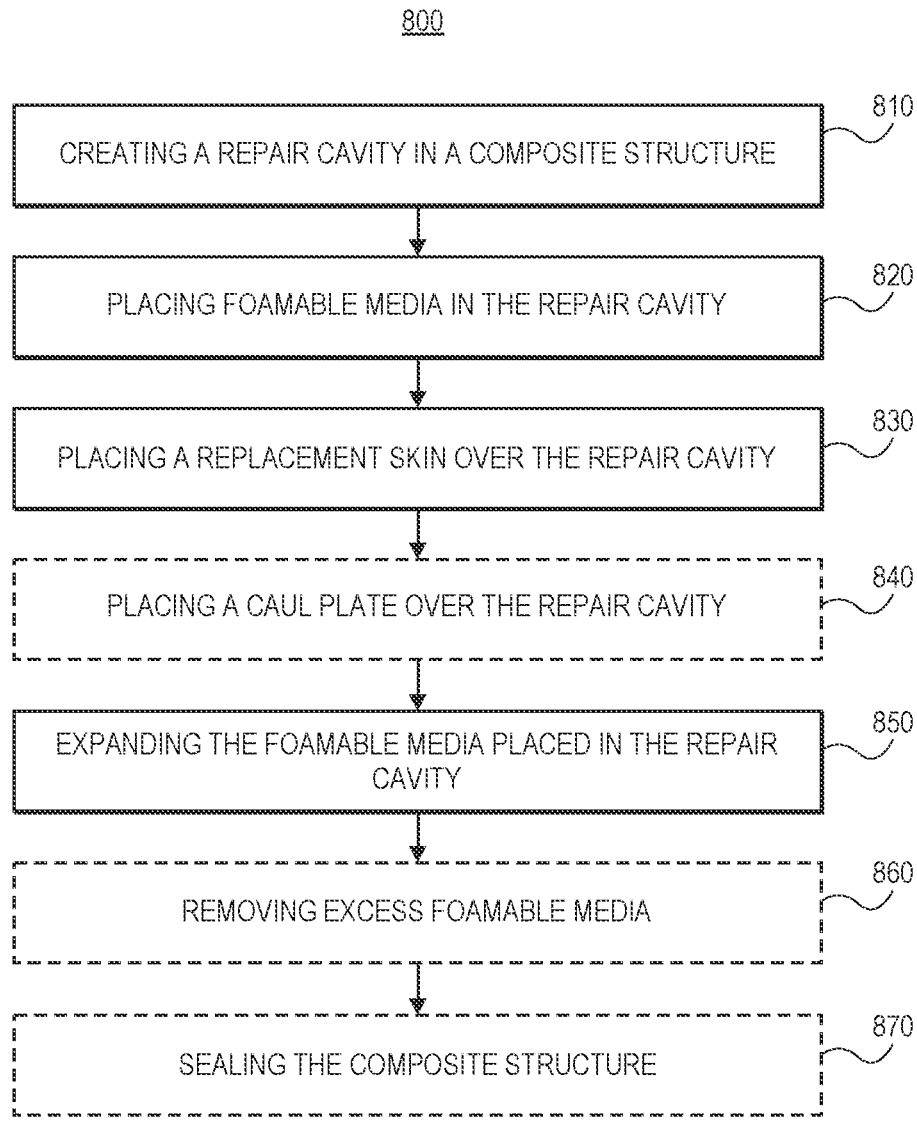
FIG. 1 illustrates a method for repairing a composite structure according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/B/B/C, AB/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the disclosure. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° to 25° Celsius unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

The inventors have developed new and novel methods of repairing composite structures using foamable media. The methods of the present disclosure can accommodate the repair of damage with irregular or complex shapes in composite structures. Furthermore, implementations of the methods describe herein are simpler in execution, allowing for repairs that can be made faster and easier than conventional methods, such as scarf repairs, by requiring minimal removal and replacement of material, simplification of the repair process, and reduction of intensive and high-skill labor, and the resulting safety, ergonomic, and cost issues, for faster and less expensive repairs.

FIG. 1 illustrates a method for repairing a composite structure according to an implementation of the present disclosure. FIGS. 2-10 illustrate implementations of the method of FIG. 1. As illustrated in FIGS. 1-10, a method 800 for repairing a composite structure 100 can include creating a repair cavity 160 in a composite structure 100, placing foamable media 200 in the repair cavity 160, placing a replacement skin 450 over the repair cavity 160, and expanding the foamable media 200 placed in the repair cavity 160. In some implementations, the method 800 includes placing a caul plate 300 over the repair cavity 160. The method 800 can further include removing excess foamable media 200 and sealing the composite structure 100.

As illustrated in FIGS. 1-7, the composite structure 100 can include a composite laminate structure. For example, the composite structure 100 can include multiple layers of composite materials, such as resin-impregnated carbon fiber-reinforced plies or composite plies 140. The composite plies 140 can include unidirectional composite tape material impregnated with an epoxy resin, woven fabric materials finished with a resin, such as fiberglass, carbon, or aramid fabrics infused with an epoxy resin, and the like.

The composite structure 100 can include a composite face sheet of a composite sandwich panel. The composite face sheet can similarly include multiple layers of composite materials, such as composite plies 140. However, generally, composite laminate structures include many more plies of composite material, such as composite plies 140, than composite face sheets of a composite sandwich panel. Accordingly, the composite structure 100 can include one of a composite laminate structure or a composite face sheet of a composite sandwich panel.

Figure 8:
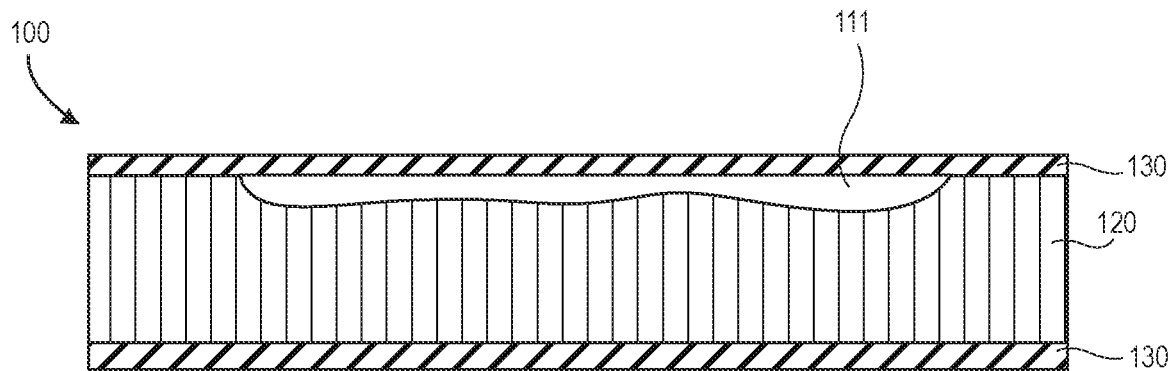
Figure 9:
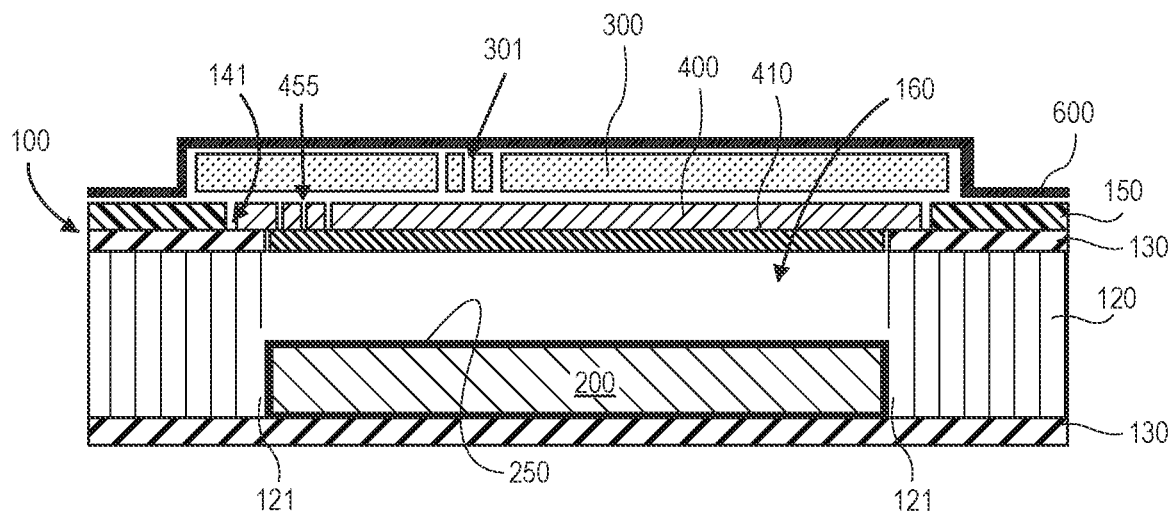
Figure 10:
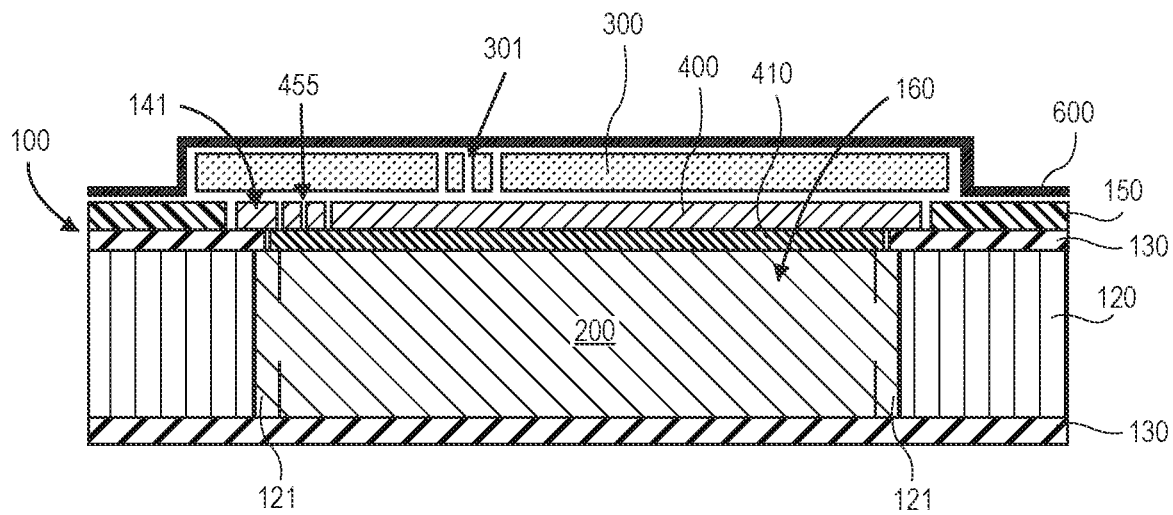

As illustrated in FIGS. 8-10, the composite structure 100 can include a composite sandwich panel including a core 120 disposed between two face sheets 130. The core 120 can include paper, metal, or composite honeycomb cores and solid or machined foam cores, and the face sheets 130 can include layers of metal, composite, fiberglass, or ceramic materials, such as composite plies 140. The core 120 can include a plurality of hollow cells 125.

As illustrated in FIG. 1, method 800 can begin with creating a repair cavity 160 in a composite structure 100 in operation 810. Creating a repair cavity 160 in a composite structure 100 can include detecting a damaged area 111 in the composite structure 100. For example, a damaged area 111 (see FIG. 8) may be determined by visual inspection for delamination and/or resin cracking, tap testing for delamination below the surface, or via nondestructive evaluation (NDE) techniques, such as impedance testing, x-ray radiography, thermography, and ultrasonics.

Figure 2:
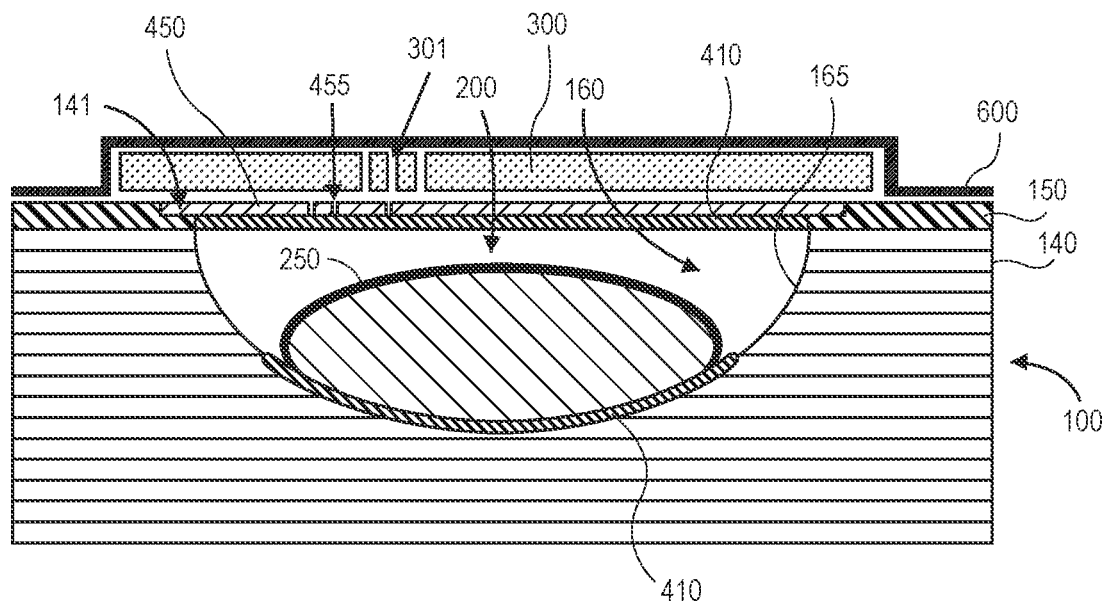
FIGS. 2-10 illustrate implementations of the method of FIG. 1.

As illustrated in FIG. 2 and FIG. 9, creating a repair cavity 160 in a composite structure 100 can include removing at least a portion of an external skin 150 corresponding to the damaged area 111 in the composite structure 100. For example, the external skin 150 can be removed if it is damaged or to better access a core 120 of the composite structure 100. As illustrated in FIG. 2, the external skin 150 can include one or more outer composite plies 140 of the composite structure 100. As illustrated in FIG. 9, the external skin 150 can include a face sheet 130 or a portion of a face sheet 130. In some implementations, the external skin 150 can include an external finish or coating applied on the composite structure 100. For example, the external skin 150 can include a conductive coating, an external paint coating, a resin coating, and the like. The external skin 150 can include an electrically conductive mesh and/or a radar absorbing material.

Creating a repair cavity 160 in a composite structure 100 can include removing material from the composite structure 100 corresponding to the damaged area 111 to define the repair cavity 160. The material of the composite structure 100 can be removed by, for example, sanding or trimming, such as by using power sanding methods (rotary, belt, etc.). Removing material from the composite structure 100 can include removing at least one of dust, debris, or contaminants from the repair cavity 160. As illustrated in FIG. 8, removing material from the damaged area in the composite structure 100 can include removing at least a portion of the core 120 from the repair cavity 160. Contaminants can include water, oil, fuel, dirt, or other foreign substances present in or around the damaged area in the composite structure 100.

For example, moisture can ingress the composite structure 100 through the damaged area and, if not removed, cycles of freezing and thawing can cause expansion and contraction of the water to advance the damage over time. Accordingly, removing material from the damaged area in the composite structure 100 can include removing water from the repair cavity 160. For example, the repair cavity 160 can be substantially free of water, and creating a repair cavity 160 in a composite structure 100 includes creating a repair cavity 160 that is substantially free of water.

Creating a repair cavity in a composite structure 100 can further include abrading a surface 165 of the repair cavity 160. As described below, abrading the surface 165 can improve an adhesion of a foamable media 200.

Operation 820 includes placing foamable media 200 in the repair cavity 160.

The foamable media 200 can be configured to expand according to a predetermined change in condition or triggering event. For example, the foamable media 200 can include an expandable or foamable material that begins in an unexpanded state, and expands, enlarges, swells, etc., in response to a predetermined change in condition or triggering event. The predetermined change in condition or triggering event can include at least one of a chemical reaction, a change in temperature, a change in pressure, addition of an activation material (such as water), application of an activation energy (such as UV and EB), or combinations thereof. For example, the foamable media 200 can include expandable pellets, beads, powder, wet foams, etc., configured to expand in volume in response to a predetermined change in condition or triggering event.

The foamable media 200 can be selected according to characteristics of the composite structure 100. For example, the foamable media 200 can be selected to match at least one of a stiffness, thermal expansion coefficient, rigidity, or impact resistance of the composite structure 100. The foamable media 200 can also be selected according to a material compatibility with the composite structure 100. The foamable media 200 can restore characteristics of the composite structure 100 after it is expanded within the repair cavity 160.

Figure 4:
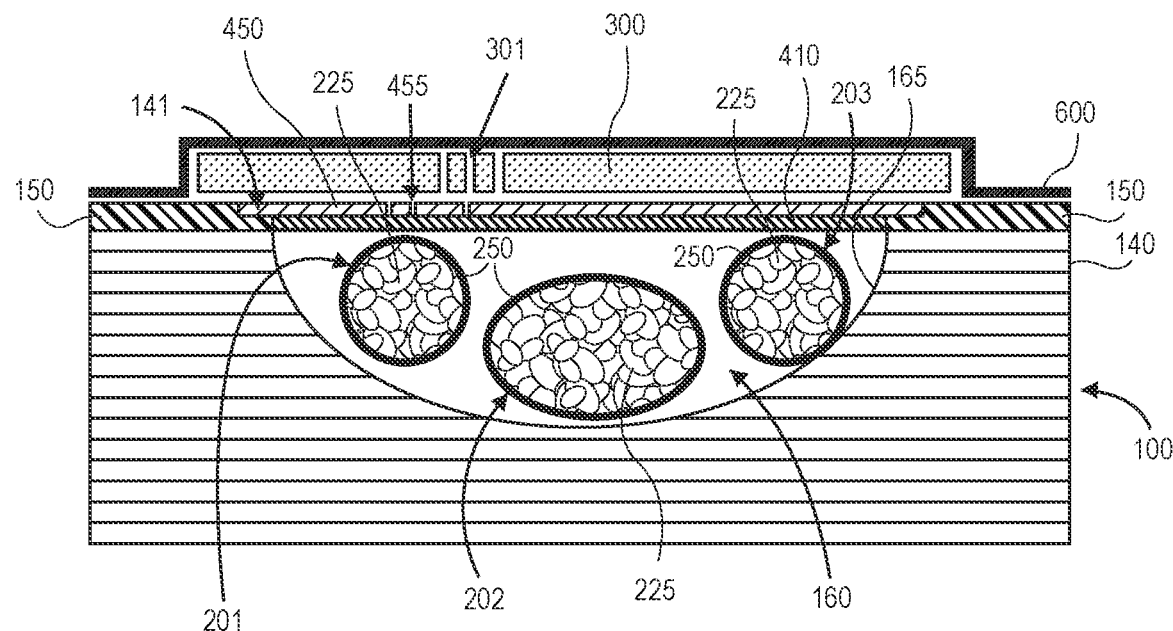
Figure 5:
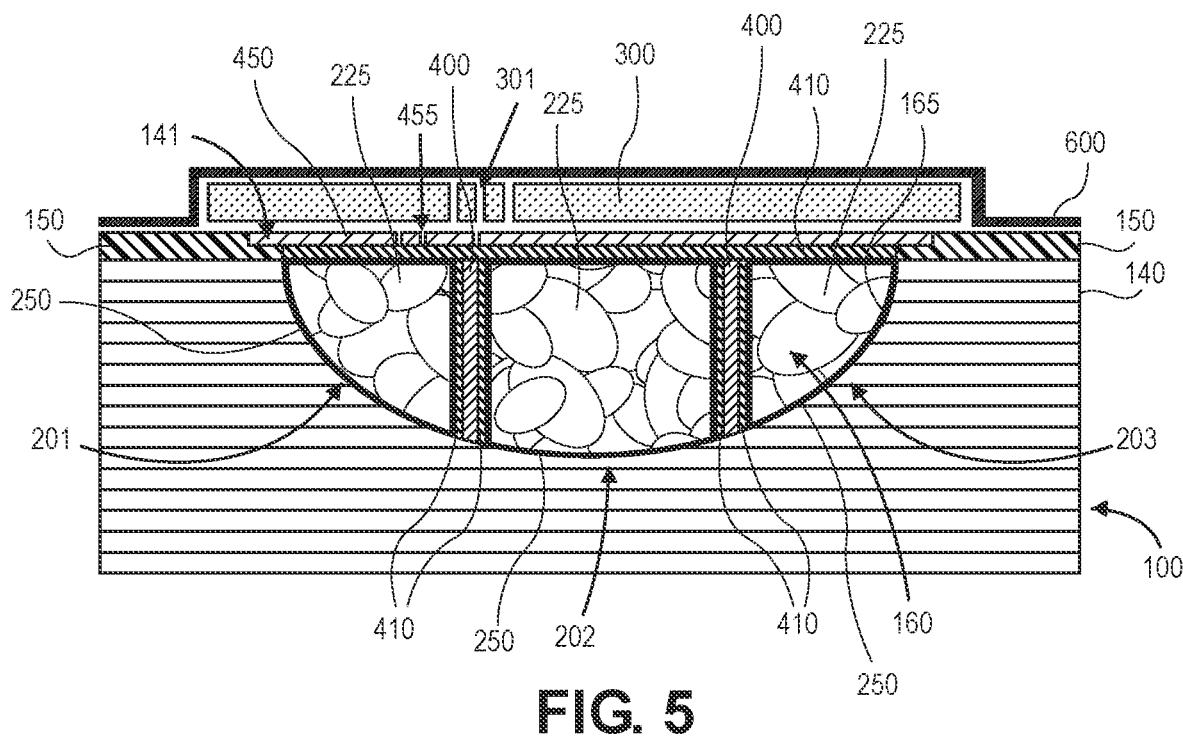
Figure 6:
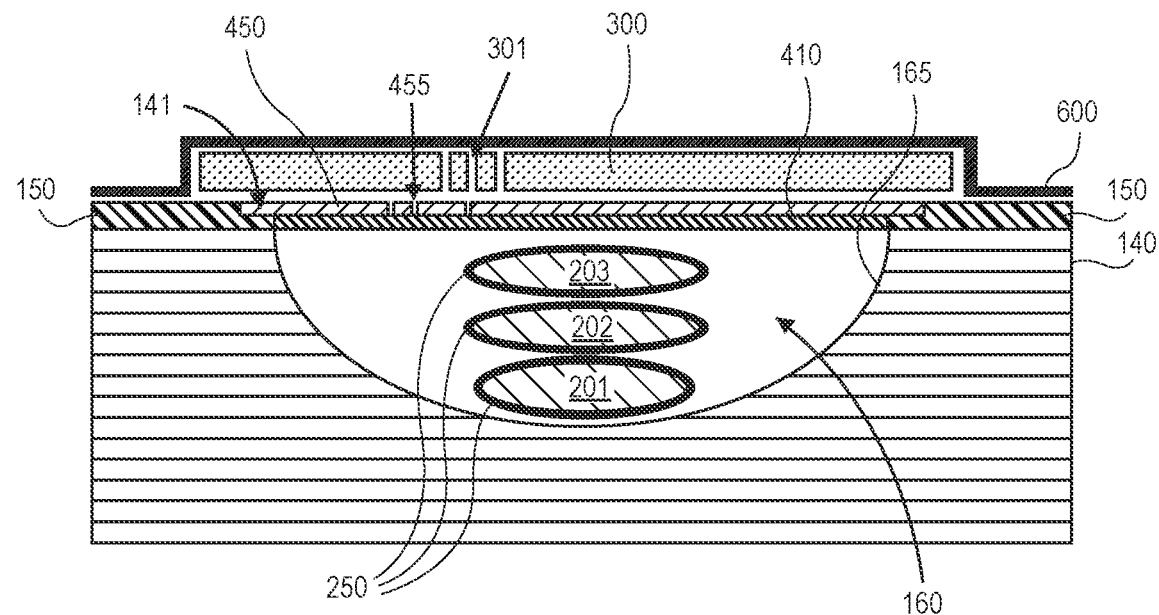

The foamable media 200 can include a polymer matrix configured to hold a foaming agent. For example, as illustrated in FIGS. 4-5, the foamable media 200 can include a plurality of expandable pellets 225 including a polymer matrix holding a foaming agent. The plurality of expandable pellets 225 can have various shapes, including rods, spheres, discs, etc.

The foaming agent, when heated to at least a predetermined temperature or in response to a predetermined change in condition or triggering event, can form a plurality of holes, pockets, or voids within the polymer matrix to increase its volume.

The polymer matrix can include one or more of a thermoset polymer, a thermoplastic polymer, or combinations thereof. The polymer matrix can include one or more of a thermoplastic polymer, a thermoset polymer, an epoxy polymer, a silicone, a polyurethane, a rubber, or combinations thereof. For example, the polymer matrix can include at least one of epoxies, toughened epoxies, phenolic resins, and polyester resins. The polymer matrix can include high-performance thermoplastic resins, such as polyether ether ketone (PEEK) and polyetherketoneketone (PEKK).

The polymer matrix can include phenolics, epoxies, polystyrene (PS), polyethylene (PE), polypropylene (PP), polyamide (PA), polyethylene terephthalate (PET), polyether ether ketone (PEEK), polyetherketoneketone (PEKK), polycarbonate (PC), polyetherimide (PEI), polyphenylene sulfide (PPS), polyphenylsulfone (PPSU), thermoplastic polyurethane (TPU), acrylonitrile butadiene styrene (ABS), polyvinyl chloride (PVC), polyurethane (PU), poly(methyl methacrylate) (PMMA), Vinyl, cyanate esters, polybismaleimides (BMI), polyimides (PI), or combinations thereof.

In some implementations, the polymer matrix includes high temperature thermoplastic polymers. In other implementations, the polymer matrix includes low temperature thermoplastic polymers. For example, the polymer matrix can include at least one of PET, PS, PEI, PPSU, or combinations thereof. The polymer matrix can include a multi-part system configured to expand without external heating.

The foaming agent can include a gas or liquid configured to react in response to the predetermined change in condition or triggering event. The foaming agent may be a gas or liquid, such as carbon dioxide, nitrogen, one or more hydrocarbons, water, and/or any other suitable physical and/or chemical foaming agent configured to react in response to a predetermined change in condition or triggering event. In other implementations, the foaming agent can include a gas, a powder, a supercritical gas, and/or other components configured to react in response to a predetermined change in condition or triggering event. The foaming agent can include only one gas, one solid, or one liquid. In other implementations, the foaming agent can include combinations of gasses, solids, or liquids, or combinations of gasses, solids, and liquids. The foaming agent can include one or more of a physical foaming agent, a chemical foaming agent, or combinations thereof.

The foaming agent can include a physical foaming agent configured to expand according to a physical reaction, such as thermal expansion. The foaming agent can expand according to at least one of a phase change, a volume expansion, or a softening of the polymer matrix. The foaming agent can include one or more of chlorofluorocarbons (CFCs), hydrochlorofluorocarbons (HCFCs), hydrofluorocarbon (HFC), hydrocarbons, such as propane, isobutane, pentane, ethanol, water vapor, carbon dioxide (CO2), nitrogen (N2), helium, or combinations thereof.

The foaming agent can include a chemical foaming agent configured to create an expansion gas according to a chemical reaction. The foaming agent can include one or more of benzene sulfonyl hydrazide, toluenesulfonyl-semicarbaside, 5-Phenyltetrazole, dinitrozopentamethylentetraamin, sodium bicarbonate, citric acid, or combinations thereof. The foaming agent can include one or more of isocyanate, azodicarbonamide, hydrazine, toluenesulfonyl-semicarbaside, or combinations thereof.

In other implementations, the foamable media 200 includes a wet foam configured to expand according to a chemical reaction or a predetermined change in condition or triggering event. For example, the foamable media 200 can include wet forms of foamable material, such as pastes, multi-part liquid mixtures, etc., that activate to expand. The wet foam can be a highly miscible multiple-part systems configured for room-temperature activation. The wet foam can be configured to activate in response to the predetermined change in condition or triggering event, such as a change in temperature, pressure, or chemical reaction. For example, the foamable media 200 can include a wet foam including a multi-part system that is mixed together to activate foaming and expand, such as a polyurethane foaming system. The foamable media 200 can include a multi-part wet foam system configured to expand without external heating.

In some implementations, the foamable media 200 includes a multi-part polyurethane foaming system, and the multi-part polyurethane foaming system is configured to mix together the multiple parts and foam within a few minutes at room temperature. The foamable media 200 can solidify and/or cure after a few hours of degassing, and excess foam can be removed, for example, by machining or trimming.

The foamable media 200 can include one or more reinforcing fibers. The reinforcing fibers can be used to increase the strength and stiffness of the foamable media 200. For example, the foamable media 200 can include a plurality of expandable pellets 225, and the plurality of expandable pellets 225 can include one or more reinforcing fibers. The reinforcing fibers can include at least one of carbon fibers, fiberglass fibers, aramid fibers, polyester fibers, hemp fibers, wood fibers, or combinations thereof. Other fibers that can be used include talc fibers, wollastonite fibers, metal fibers, ceramic fibers, aromatic polyamide fibers, or combinations thereof. The one or more reinforcing fibers can improve a thermal and/or electrical conductivity of the foamable media 200. The one or more reinforcing fibers can be long or short, or combinations of long and short reinforcing fibers. The one or more reinforcing fibers can be woven into a cloth, formed in uniaxial tape, or be randomly oriented short fibers.

In some implementations, the foamable media 200 includes a flexible film 250. The flexible film 250 can be implemented as a pleated or expandable bag. As illustrated in FIG. 2, the expandable material of the foamable media 200 can be encapsulated by the flexible film 250. Encapsulating the expandable material can minimize contamination issues. For example, when the foamable media 200 includes free form pellets or powders, encapsulating the expandable material with a flexible film 250 minimizes the potential for foreign object damage (FOD) issues.

Each of the plurality of expandable pellets 225 can be encapsulated by a flexible film 250. In other implementations, the plurality of expandable pellets 225 are encapsulated by a flexible film 250. The flexible film 250 is configured to expand with an expansion of the expandable material of the foamable media 200. The flexible film 250 can include a stretchable material, such as, at least one of thermoplastic elastomers (TPE), silicon, natural rubber, natural or synthetic latex, polyethylene (PE), or combinations thereof. The flexible film 250 can include one or more of polyolefins, polyester, polystyrene, polyvinyl chloride (PVC), polyvinyl fluoride (PVF), polyvinylidene difluoride (PVDF), PA, TPU, or combinations thereof. In some implementations, high strength films, such as PEEK and PEKK, are too rigid, cannot stretch sufficiently, and cannot be used in the flexible film 250. Accordingly, in some implementations, the flexible film does not include PEEK and PEKK.

The flexible film 250 can be configured to improve a thermal and/or electrical conductivity of the foamable media 200. For example, the flexible film 250 can include one or more conductive materials configured to improve at least one of a thermal or electrical conductivity of the foamable media 200. For example, the flexible film 250 can function as heat transfer and/or electrical pathways to enhance a thermal and/or electrical conductivity of the foamable media 200. A higher thermal conductivity can help dissipate heat more quickly and help avoid overheating or even fire hazards. A higher electrical conductivity can enhance an electromagnetic damage protection, such as protection against lightning strikes.

The one or more conductive materials can include carbonaceous materials, such as graphite fibers and/or carbon nanotubes, metals, such as gold, silver, aluminum, or bronze, scrim, wires, or a mesh embedded into the flexible film 250 or printed or deposited onto the flexible film 250 using known deposition methods.

The flexible film 250 can include one or more reinforcing fibers. The reinforcing fibers can be used to increase the strength and stiffness of the flexible film 250 and/or the foamable media 200. The reinforcing fibers can include one or more of carbon fibers, fiberglass fibers, aramid fibers, polyester fibers, hemp fibers, wood fibers, or combinations thereof. Other fibers that can be used include talc fibers, wollastonite fibers, metal fibers, aromatic polyamide fibers, or combinations thereof. In some implementations, the reinforcing fibers can improve a thermal and/or electrical conductivity of the flexible film 250

The reinforcing fibers can be sprayed on the flexible film 250 during spray-on film fabrication, attached adhesively to the flexible film 250, or mixed into the flexible film 250 when in liquid form before the flexible film 250 is formed into sheets. The reinforcing fibers in the flexible film 250 can be non-woven to enhance an expansion of the flexible film 250.

The flexible film 250 can be adhesive. For example, the flexible film 250 can include a thermoset film adhesive. The flexible film 250 can bond the foamable media 200 to at least one of the surface 165 of the repair cavity 160 and/or a replacement skin 450. For example, the flexible film 250 is adhesive and is configured to bond the foamable media 200 to at least one of the repair cavity 160 and/or a replacement skin 450.

Figure 3:
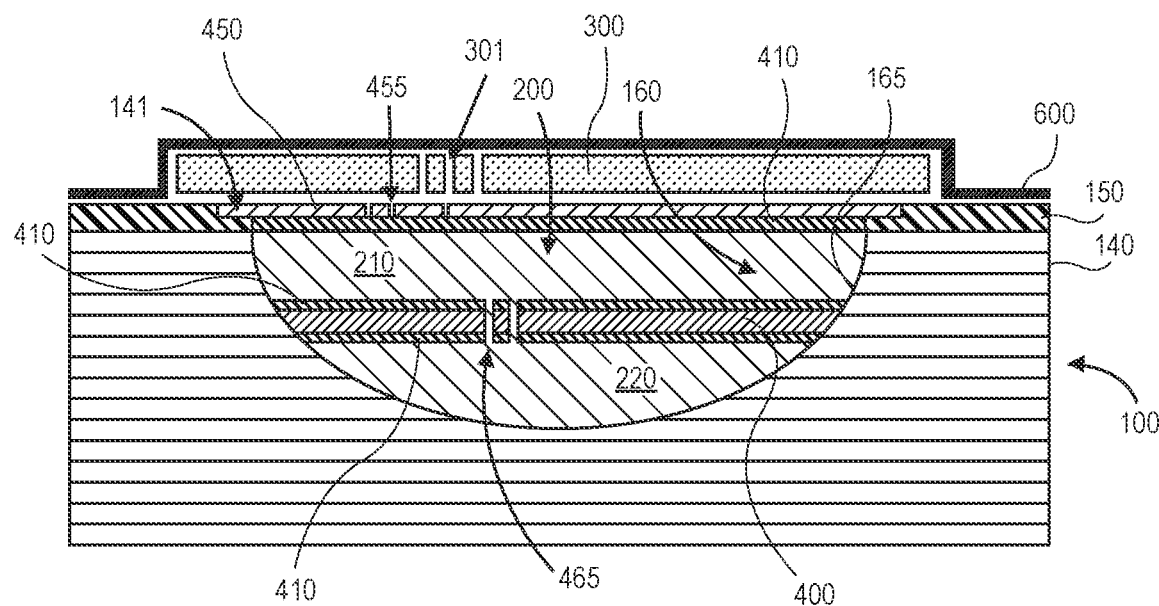

The foamable media 200 can include two or more layers of foamable media 200. For example, as illustrated in FIG. 3, the foamable media 200 can include a first foamable media layer 210 and a second foamable media layer 220. Accordingly, placing foamable media 200 in the repair cavity 160 can include placing two or more layers of foamable media 200 in the repair cavity 160.

As illustrated in FIG. 3, the two or more layers of foamable media 200 can be separated by one or more septum 400. The septum 400 can increase a rigidity, strength, or stiffness of the overall composite structure 100. Accordingly, placing foamable media 200 in the repair cavity 160 can further include placing one or more septum 400 in the repair cavity 160. At least one of the one or more septum 400 can be placed between the two or more layers of foamable media 200. The septum 400 can separate and/or segregate two or more layers of foamable media 200 with different functional characteristics. For example, by separating more rigid foamable media 200 at the center of the repair cavity 160 from more flexible foamable media 200 at the edge of the repair cavity 160. Septum 400 can be added within the repair cavity 160 to match the rigidity, strength, or stiffness characteristics of the composite structure 100 after the repair process is complete. In some implementations, the septum 400 can provide attachment points for the foamable media 200.

In some implementations, at least one of the one or more septum 400 includes a plurality of holes or vents 465 configured to allow the foamable media 200 to expand through at least one of the one or more septum 400. The plurality of holes or vents 465 can also allow pressure relief during expansion of the foamable media 200 while generally limiting migration of the foamable media 200.

The one or more septum 400 can include a composite material. For example, a composite material of the one or more septum 400 can be the same material as the composite structure 100 and/or the composite plies 140. In other implementations, the one or more septum 400 can include at least one of fiber reinforced composite laminates, thermosets (epoxies, phenolics, etc.), thermoplastic solid sheets, thermoplastic foam sheets, or combinations thereof. For example, the one or more septum 400 can include long fiber reinforced composite plies. Long fiber reinforced composite plies in septum 400 can provide stiffness or strength, as could layering of sheets to form the septum 400. Septum comprising foam or solid material with holes can provide a controlled flow barrier for separating the foamable media 200.

In other implementations, the one or more septum 400 can include a pre-preg. As used herein, the term "pre-preg" refers to pre-impregnated composite plies, such as epoxy impregnated unidirectional composite tape or carbon fiber. A pre-preg may be flexible until it is cured, often by heat and pressure curing or curing within an autoclave.

At least one of the two or more layers of foamable media 200 can have one or more different functional characteristics than the rest of the two or more layers of foamable media 200. At least one of the two or more layers of foamable media 200 can have one or more same functional characteristics than the rest of the two or more layers of foamable media 200. For example, a functional characteristic can include a fire-retardance, rigidity or stiffness, impact resistance, toughness, tensile strength, compression strength, and buckling resistance. The material or type of the two or more layers of foamable media 200 can determine one or more functional characteristics. For example, at least one of the two or more layers of foamable media 200 can include a nano-cellular foam layer to enhance thermal insulation, an open-cell foam layer to enhance acoustic absorption, a rigid material, such as a PEKK or PEEK foam layer, to enhance stiffness, or a flexible material, such as a TPU foam layer to enhance cushioning performance. Accordingly, as illustrated in FIG. 3, an expandable material of the first foamable media layer 210 can determine one or more of its functional characteristics, and an expandable material of the second foamable media layer 220 can determine one or more of its functional characteristics. The expandable material of at least one of the two or more layers of foamable media 200 can be different than the expandable material of the rest of the two or more layers of foamable media 200. For example, an expandable material of the first foamable media layer 210 can be different than an expandable material of the second foamable media layer 220.

The foamable media 200 can include two or more foamable media 200. For example, as illustrated in FIGS. 4-7, the foamable media 200 can include a first foamable media 201, a second foamable media 202, and a third foamable media 203. Having two or more foamable media 200 allows the ability to achieve multiple functions simultaneously. For example, a first foamable media 201 can comprise an open-cell flexible foam to attenuate sound, and a second foamable media 202 can comprise a close-cell rigid foam to enhance fire retardance and overall strength and stiffness.

Figure 7:
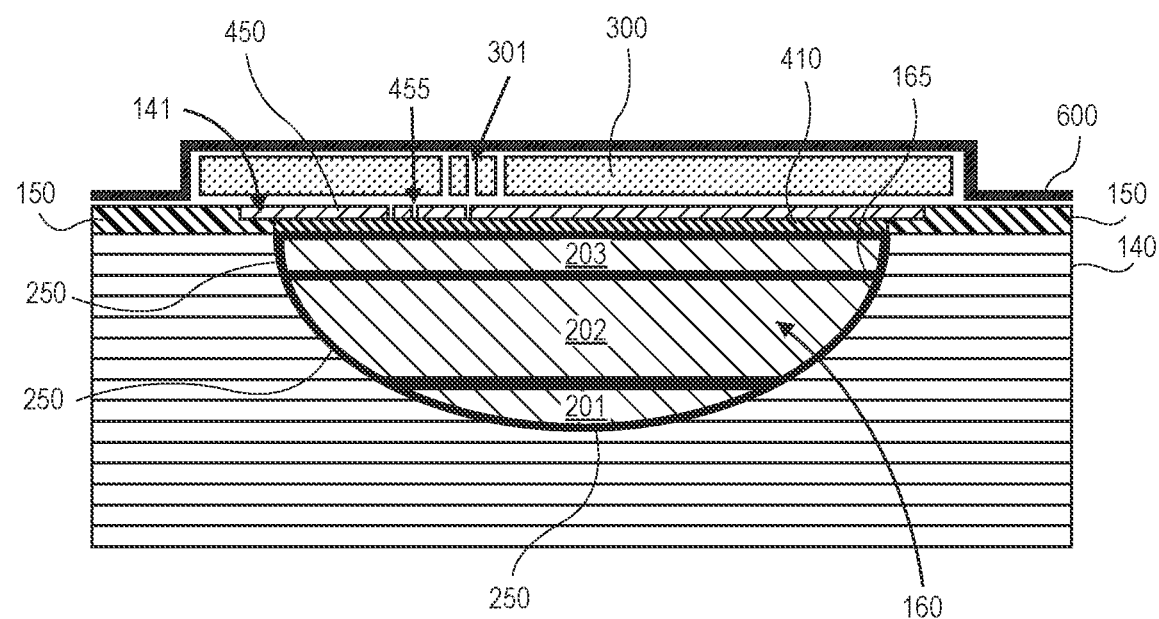

At least one of the two or more foamable media 200 can include a flexible film 250. As illustrated in FIG. 7, the flexible film 250 can be adhesive and the flexible film 250 can bond the two or more foamable media 200 together. For example, the flexible film 250 can be adhesive and the flexible film 250 can bond the two or more foamable media 200 to the repair cavity 160 and/or the replacement skin 450. As illustrated in FIGS. 4-7, the two or more foamable media 200 can be arranged horizontally or can also be arranged vertically. Accordingly, placing foamable media 200 in the repair cavity 160 can include placing two or more foamable media 200 in the repair cavity 160.

As illustrated in FIGS. 3 and 5, the two or more foamable media 200 can be separated by one or more septum 400. Accordingly, placing foamable media 200 in the repair cavity 160 can further include placing one or more septum 400 in the repair cavity 160. At least one of the one or more septum 400 can be placed between the two or more foamable media 200. The one or more septum 400 can help maintain an integrity of the composite structure 100 once the two or more foamable media 200 are expanded within the repair cavity 160. The septum 400 used can be configured to meet the strength and stiffness requirements of the composite structure 100. In some circumstances, bonding foamable media 200 to each other may cause weakening or bonding issues. Accordingly, in some implementations, the two or more foamable media 200 are bonded to one or more septum 400 and not directly to each other.

At least one of the one or more septum 400 can include a plurality of holes or vents 465 to allow two or more foamable media 200 to expand through the at least one of the one or more septum 400. The plurality of holes or vents 465 allow the two or more foamable media 200 to mix together uniformly, especially in scenarios where the expandable materials are liquid or paste. In addition, the plurality of holes or vents 465 can also allow for excess pressure to escape during an expansion of the two or more foamable media 200 to avoid damage to the composite structure 100 during the repair operations.

At least one of the two or more foamable media 200 can have a different functional characteristic than the rest of the two or more foamable media 200. The expandable material of the two or more foamable media 200 can determine one or more functional characteristics.

For example, at least one of the two or more foamable media 200 can include a nano-cellular foam layer to enhance thermal insulation, an open-cell foam layer to enhance acoustic absorption, a rigid material, such as a PEKK or PEEK foam layer, to enhance stiffness, or a flexible material, such as a TPU foam layer to enhance cushioning performance. Accordingly, as illustrated in FIG. 4-7, an expandable material of a first foamable media 201 can determine one or more of its functional characteristics, an expandable material of a second foamable media 202 can determine one or more of its functional characteristics, and an expandable material of a third foamable media 203 can determine one or more of its functional characteristics. In one implementation, the expandable material of at least one of the two or more foamable media 200 can be different than the expandable material of the rest of the two or more foamable media 200. For example, an expandable material of the first foamable media 201 can be different than an expandable material of the second and third foamable media 202 and 203.

Placing foamable media 200 in the repair cavity 160 can further include placing one or more adhesive layers 410 in the repair cavity 160. For example, as illustrated in FIG. 2, the one or more adhesive layers 410 can be placed between the foamable media 200 and the replacement skin 450. Accordingly, placing foamable media 200 in the repair cavity 160 can include placing at least one of the one or more adhesive layers 410 between the foamable media 200 and the replacement skin 450. The one or more adhesive layers 410 can help bond the foamable media 200 and the replacement skin 450.

As illustrated in FIG. 3, the one or more adhesive layers 410 can be placed between the two or more layers of foamable media 200. In some implementations, the one or more adhesive layers 410 can be placed between the two or more layers of foamable media 200 and the one or more septum 400. The one or more adhesive layers 410 can help bond the two or more layers of foamable media 200 or can help bond the two or more layers of foamable media 200 and the one or more septum 400. The one or more adhesive layers 410 enhance a strong bond between the two or more layers of foamable media 200. Similarly, the one or more adhesive layers 410 can also enhance a strong bond between layers of foamable media 200 and septum 400. Strong bonds between these materials can ensure the structural integrity of the composite structure 100 and avoid delamination issues. Accordingly, placing foamable media 200 in the repair cavity 160 can include placing at least one of the one or more adhesive layers 410 between the two or more layers of foamable media 200. Placing foamable media 200 in the repair cavity 160 can include placing at least one of the one or more adhesive layers 410 between the two or more layers of foamable media 200 and the one or more septum 400.

As illustrated in FIG. 5, the one or more adhesive layers can be placed between the two or more foamable media 200. The one or more adhesive layers 410 can be placed between the two or more foamable media 200 and the one or more septum 400. The one or more adhesive layers 410 can help bond the two or more foamable media 200. The one or more adhesive layers 410 can help bond the two or more foamable media 200 and the one or more septum 400. Accordingly, placing foamable media 200 in the repair cavity 160 can include placing at least one of the one or more adhesive layers 410 between the two or more foamable media 200. Placing foamable media 200 in the repair cavity 160 can include placing at least one of the one or more adhesive layers 410 between the two or more foamable media 200 and the one or more septum 400.

In other implementations, placing foamable media 200 in the repair cavity 160 includes placing one or more adhesive layers 410 in the repair cavity 160 and placing the two or more foamable media 200 on the one or more adhesive layers 410 placed in the repair cavity 160.

As illustrated in FIG. 2, the one or more adhesive layers can be placed on the surface 165 of the repair cavity 160. The one or more adhesive layers can help bond the foamable media 200 to the surface 165 of the repair cavity 160. Accordingly, placing foamable media 200 in the repair cavity 160 can include placing at least one of the one or more adhesive layers 410 on the surface 165.

The one or more adhesive layers 410 can include at least one of an epoxy resin, an epoxy film, a paste, a glue, a plastic film, or combinations thereof. The one or more adhesive layers 410 can include an epoxy resin, an epoxy film, a paste, a glue, a plastic film, such as a polyethylene terephthalate or polyester (PET) film, a polyimide (PI) film, a polyphenylsulfone (PPSU) film, a polymethyl methacrylate (PMMA) film, or another type of material configured to bond substrates. The one or more adhesive layers 410 can bond the foamable media 200 to at least one of the repair cavity 160, the one or more septum 400, or the replacement skin 450.

Operation 830 can include placing a replacement skin 450 over the repair cavity 160. As illustrated in FIG. 2, in some implementations, the external skin 150 is removed such as to create an inset 141 for the replacement skin 450 to prevent the replacement skin 450 from protruding over an external surface of the composite structure 100. Accordingly, creating a repair cavity 160 in a composite structure 100 can include removing at least a portion of an external skin 150 corresponding to the damaged area in the composite structure 100, and removing at least a portion of an external skin 150 corresponding to the damaged area in the composite structure 100 can include creating an inset 141 in the external skin 150 to accommodate the replacement skin 450. The height of the inset 141 can correspond to a height of the replacement skin 450. The inset 141 can define a shelf configured to receive at least a portion or an edge of the replacement skin 450. The replacement skin 450 is configured to improve stiffness and impact resistance properties of the composite structure 100. The replacement skin 450 can be configured to act as the external skin 150 and can be configured to receive an external finish or coating as described above.

The replacement skin 450 can include a composite material. For example, a composite material of the replacement skin 450 can be the same material as the composite structure 100 and/or the composite plies 140. In other implementations, the replacement skin 450 can include at least one of fiber reinforced composite laminates, thermosets (epoxies, phenolics, etc.), thermoplastic solid sheets, thermoplastic foam sheets, or combinations thereof. For example, the replacement skin 450 can include a pre-cured composite skin. In other implementations, the replacement skin 450 can include a pre-preg or uncured composite skin. Accordingly, placing a replacement skin 450 over the repair cavity 160 can include placing a pre-cured composite skin over the repair cavity 160 as a replacement skin 450 or can include placing a pre-preg composite skin as a replacement skin 450 over the repair cavity 160.

In some implementations, the replacement skin 450 includes one or more vent holes 455. The vent holes 455 can be configured to vent an outgassing associated with the expansion of the foamable media 200 or allow air to escape from the repair cavity 160 as the foamable media 200 expands. The vent holes 455 can be configured to allow a vacuum to be applied to the repair cavity 160 and/or the foamable media 200.

Placing a replacement skin 450 over the repair cavity 160 can include placing the replacement skin 450 over an adhesive layer 410.

The replacement skin 450 is coupled to the external skin 150. For example, the replacement skin 450 can be bonded to the external skin 150. An adhesive can be used to bond the replacement skin 450 to the inset 141. Accordingly, placing a replacement skin 450 over the repair cavity 160 can include bonding the replacement skin 450 to the external skin 150. In some implementations, the replacement skin 450 is bonded over damages areas of the external skin 150 corresponding to the damaged area 111 and/or the repair cavity 160. The replacement skin 450 can overlap edges of the external skin 150 surrounding the repair cavity 160. In other implementations, the replacement skin 450 is placed within the removed portions of the external skin 150 to function as a plug.

Method 800 can further include placing a caul plate 300 over the repair cavity 160 in operation 840. For example, when the replacement skin 450 is implemented as a pre-cured composite skin, the replacement skin 450 can act as a caul plate and there may be no need to place a caul plate 300 over the repair cavity 160. In other implementations, for example when the replacement skin 450 is implemented as an uncured composite skin or pre-preg, a caul plate 300 can be placed over the repair cavity 160 to providing a smooth surface upon curing of the replacement skin 450. The caul plate 300 can help ensure that the replacement skin 450 does not protrude over a surface of the composite structure 100.

Together with the replacement skin 450, the caul plate 300 can provide a high-pressure environment for the expansion of the foamable media 200. That is, the replacement skin 450 and the caul plate 300 can constrain the foamable media 200 within the repair cavity 160 to ensure uniform and complete expansion of the foamable media 200 within the repair cavity 160.

For example, the foamable media 200 can achieve pressures up to 100 psi during an expansion of the foamable media 200 in the repair cavity 160 covered by at least one of the replacement skin 450 or the caul plate 300. A pressure within the repair cavity can achieve pressures from about 5 psi to about 100 psi during an expansion of the foamable media 200 in the repair cavity 160 covered by at least one of the replacement skin 450 or the caul plate 300. The pressure realized by an expansion of the foamable media 200 allows for a good quality composite cure and/or expansion of the foamable media 200 throughout the repair cavity 160 while not being high enough to destroy an internal structure of the core 120 or the composite structure 100.

In some implementations, the replacement skin 450 and/or the caul plate 300 are configured to maintain a pressure of 100 psi or less in the repair cavity 160 during an expansion of the foamable media 200. In other implementations, the replacement skin 450 and/or the caul plate 300 are configured to maintain a pressure of 50 psi or less in the repair cavity 160 during an expansion of the foamable media 200.

The caul plate 300 can include a composite material. For example, a composite material of the caul plate 300 can be the same material as the composite structure 100 and/or the composite plies 140. In other implementations, the caul plate 300 can include at least one of fiber reinforced composite laminates, thermosets (epoxies, phenolics, etc.), thermoplastic solid sheets, thermoplastic foam sheets, or combinations thereof.

In some implementations, the caul plate 300 includes one or more vent holes 301. The vent holes 301 can be configured to vent an outgassing associated with the expansion of the foamable media 200 or allow air to escape from the repair cavity 160 as the foamable media 200 expands. The vent holes 301 can be configured to allow a vacuum to be applied to the repair cavity 160 and/or the foamable media 200. In addition, the one or more vent holes 301 can help maintain a target maximum pressure in the repair cavity 160 during an expansion of the foamable media 200.

The caul plate 300 can be held against the external skin 150. For example, clamps (not illustrated) can be used to hold the caul plate 300 against the external skin 150. Accordingly, placing a caul plate 300 over the repair cavity 160 can include holding the caul plate 300 against the external skin 150. In other implementations, a sealed-edge vacuum bag 600 covers an edge of the caul plate 300 to hold the caul plate 300 against the external skin 150.

Operation 850 can include expanding the foamable media 200 placed in the repair cavity 160. Expanding the foamable media 200 placed in the repair cavity 160 can include applying the predetermined change in condition or triggering event to the foamable media 200. For example, expanding the foamable media 200 placed in the repair cavity 160 can include applying heat to the foamable media 200 placed in the repair cavity 160, allowing the foamable media 200 to react chemically or physically. The heat can be applied using a heat blanket or by induction heating using an exterior electromagnetic coil. In some implementations, the replacement skin 450 is a pre-preg, and a heat applied to expand the foamable media 200 also serves to cure the replacement skin 450. Accordingly, expanding the foamable media 200 placed in the repair cavity 160 can include applying heat to the foamable media 200 placed in the repair cavity 160, wherein the heat expands the foamable media 200 and/or cures the replacement skin 450.

As illustrated in FIG. 2, expanding the foamable media 200 placed in the repair cavity 160 can include placing a vacuum bag 600 over the replacement skin 450 and applying a vacuum to the foamable media 200. In some implementations, expanding the foamable media 200 placed in the repair cavity 160 can include placing a vacuum bag 600 over the caul plate 300 and applying a vacuum to the foamable media 200. The foamable media 200 can expand into substantially all areas of the repair cavity 160. As illustrated in FIGS. 8-10, expanding the foamable media 200 placed in the repair cavity 160 can include expanding the foamable media 200 into one or more damaged and/or crushed cells 121 of the core 120 and at least partially restoring a shape or volume of the one or more damaged and/or crushed cells 121 when expanded. For example, at least one of the plurality of hollow cells of the core 120 can be damaged or crushed and expanding the foamable media 200 placed in the repair cavity 160 can include expanding the foamable media 200 into the at least one damaged or crushed cell 121 and at least partially restoring a shape or volume of the at least one damaged or crushed cell 121 when the foamable media 200 is expanded.

Expanding the foamable media 200 placed in the repair cavity 160 can include solidifying, stabilizing, or curing the foamable media 200. For example, the foamable media 200 can solidify by polymerization or crosslinking. The foamable media 200 can solidify or become rigid by cooling. In other implementations, the foamable media 200 can be cured by ultraviolet (UV) radiation.

At least one of the replacement skin 450 or the caul plate 300 maintains the foamable media 200 within the repair cavity 160 during an expansion and solidifying or curing process of the foamable media 200. For example, at least one of the replacement skin 450 or the caul plate 300 maintains a pressure on the foamable media while heating to sinter the foamable media 200 together. In some implementations, the foamable media 200 has a sufficient viscoelasticity after expansion to prevent collapse. Accordingly, expanding the foamable media 200 placed in the repair cavity 160 can include using at least one of the replacement skin 450 or the caul plate 300 to apply a pressure on the foamable media 200 during expansion. At least one of the vent holes 455 or the one or more vent holes 301 can be used to inspect an expansion of the foamable media 200. For example, a sensor, such as an optical tool or borescope 650 (see FIG. 16) can be inserted through at least one of the vent holes 455 or the one or more vent holes 301 to inspect an expansion of the foamable media 200 in the repair cavity 160.

Method 800 can further include removing excess foamable media 200 in operation 860. Removing excess foamable media 200 can include removing foamable media 200 expanded outside of the repair cavity 160. For example, foamable media expanded through at least one of the vent holes 455 or the one or more vent holes 301.

Method 800 can further include sealing the composite structure 100 in operation 870. Sealing the composite structure 100 can include removing the caul plate 300 and sealing the one or more vent holes 455. For example, the one or more vent holes 455 can be sealed using adhesive, sealant, plugs coated in adhesive, small adhesive-backed patches, and the like. In some implementations, sealing the composite structure 100 can include re-applying an external finish or coating applied on the composite structure 100, such as a conductive coating, an external paint coating, a resin coating, and the like. Accordingly, sealing the composite structure 100 can include sealing the one or more vent holes 455 in the replacement skin 450 and applying an external finish or coating to the replacement skin 450.

Figure 11:
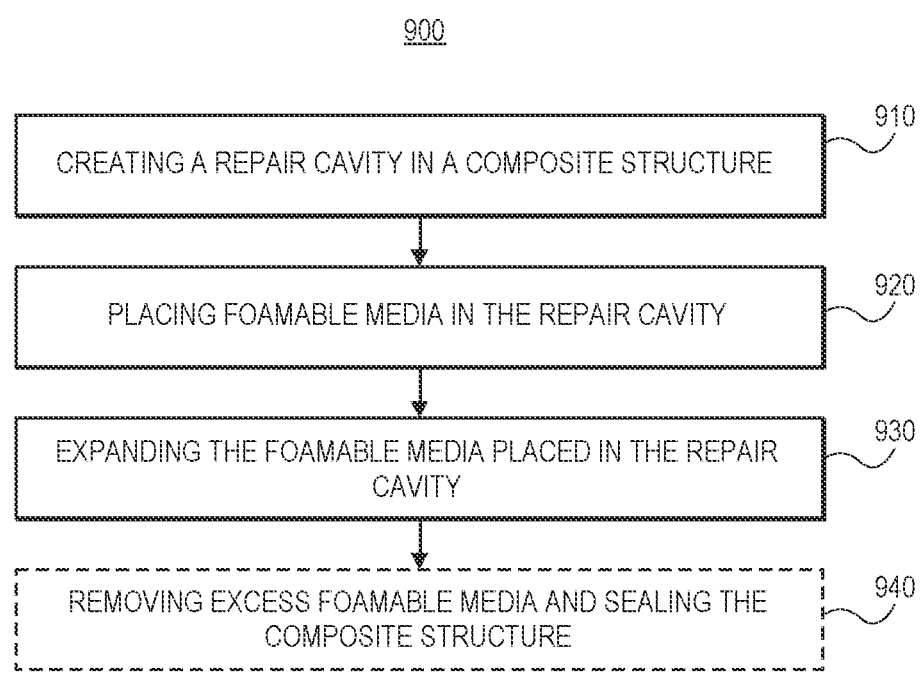
FIG. 11 illustrates a method for repairing a composite structure according to an implementation of the present disclosure.

FIG. 11 illustrates a method for repairing a composite structure according to an implementation of the present disclosure. FIGS. 12-17 illustrate implementations of the method of FIG. 11. FIGS. 11-17 illustrates a method that, for instance, could use components, such as the foamable media 200 and the caul plate 300 described above. As such, the discussion below will reference various components as illustrated in FIG. 1-10. As illustrated in FIGS. 11-17, a method 900 for repairing a composite structure 100 can include creating a repair cavity 160 in the composite structure 100, placing foamable media 200 in the repair cavity 160, and expanding the foamable media 200 placed in the repair cavity 160. The method 900 can further include removing excess foamable media 200 and sealing the composite structure 100.

Method 900 can begin with creating a repair cavity 160 in the composite structure 100 in operation 910. As illustrated in FIGS. 12-17, the composite structure 100 can include a composite sandwich panel including a core 120 between two face sheets 130. The core 120 can include paper, metal, or composite honeycomb cores and solid or machined foam cores, and the face sheets 130 can include layers of metal, composite, fiberglass, or ceramic materials, such as composite plies 140. The core 120 defines a plurality of hollow cells 125. In some implementations, an external skin 150 is disposed over a top face sheet 130 of the composite structure 100.

Figure 12:
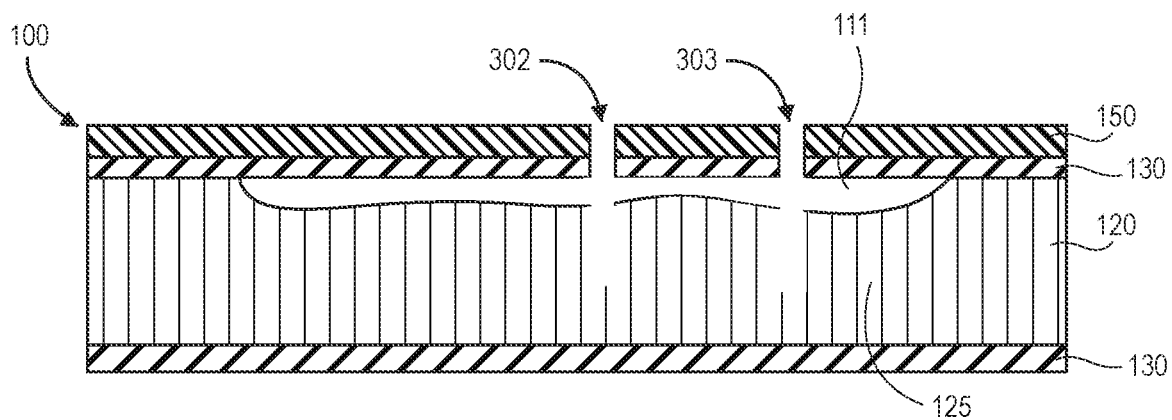
FIGS. 12-17 illustrate implementations of the method of FIG. 11.
Figure 15:
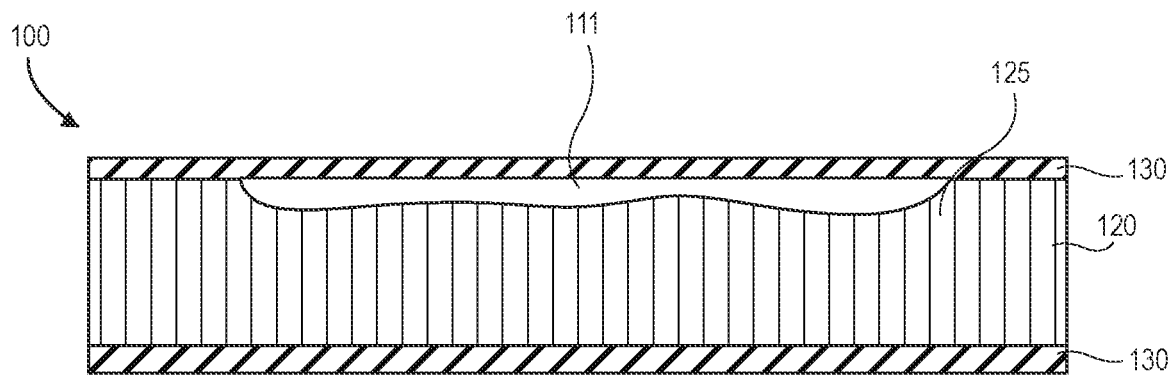

Creating a repair cavity 160 in the composite structure 100 can include detecting a damaged area 111 in the composite structure 100. For example, as illustrated in FIGS. 12 and 15, a damaged area 111 can be determined by visual inspection for delamination and/or resin cracking, tap testing for delamination below the surface, or via nondestructive evaluation (NDE) techniques, such as impedance testing, x-ray radiography, thermography, and ultrasonics. The damaged area 111 can be detected through one or more access holes 302 and/or one or more vent holes 303 created through a top face sheet 130 of the composite structure 100 and/or an external skin 150 of the composite structure 100. The damaged area 111 can also be detected through breaks in an external skin 150 of the composite structure 100 caused by, for example, impact damage to the composite structure 100. Detecting a damaged area 111 in the composite structure 100 can include inserting a sensor, such as an optical tool or borescope through at least one of the one or more access holes 302 and/or the one or more vent holes 303 to detect the damaged area 111.

Creating a repair cavity 160 in the composite structure 100 can include creating one or more access holes 302 and/or one or more vent holes 303 in the composite structure 100. For example, as illustrated in FIGS. 12-17, an access holes 302 and a vent hole 303 can be created through an external skin 150 of the composite structure 100 and/or a top face sheet 130 of the composite structure 100. The one or more access holes 302 and/or the one or more vent holes 303 can be created via drilling, for example, using an electric drill motor and selected drill bit. In other implementations, the one or more access holes 302 and/or the one or more vent holes 303 can include breaks in the external skin 150 caused by, for example, impact damage to the composite structure 100. For example, breaks in the external skin 150 can be trimmed, expanded, or partially fixed to create the one or more access holes 302 and/or the one or more vent holes 303.

The one or more access holes 302 and/or the one or more vent holes 303 can be used to access the damaged area 111 and remove portions of the composite structure 100 to create the repair cavity 160. Accordingly, creating a repair cavity 160 in the composite structure 100 can include removing portions of the composite structure 100 through the one or more access holes 302 and/or the one or more vent holes 303 to create the repair cavity 160. The one or more access holes 302 and/or the one or more vent holes 303 can have a diameter from about ⅛ to about ¼ inch. For example, the one or more access holes 302 and/or the one or more vent holes 303 can have a diameter of ¼ inch or less.

A tool 700 can be used to remove portions of the composite structure 100 through the one or more access holes 302 and/or the one or more vent holes 303. As illustrated in FIGS. 12-17, method 900 avoids removing portions of the external skin 150 corresponding to the repair cavity 160 and/or the damaged area 111.

Figure 13:
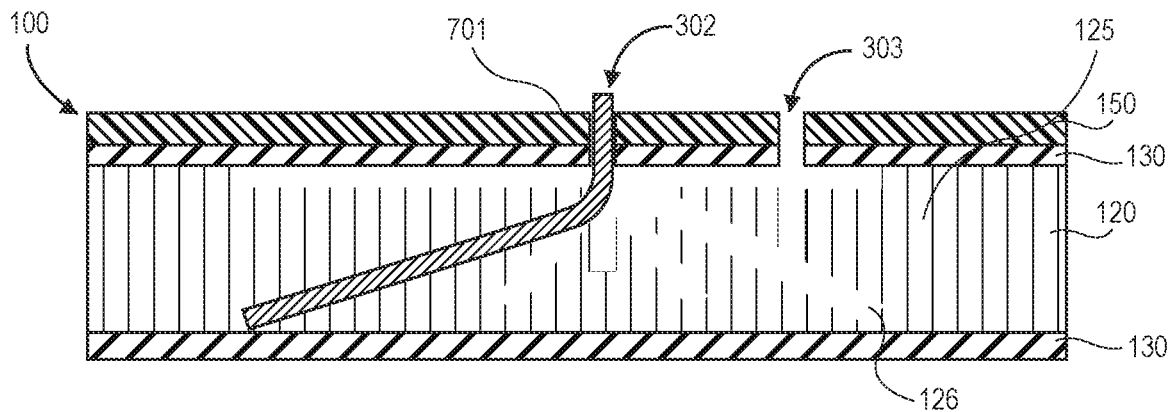

As illustrated in FIG. 13, the tool 700 can be a foamable media injection tube 701. The foamable media injection tube 701 can be inserted through the access hole 302 and used to create one or more channels 126 within the core 120. The one or more channels 126 can penetrate through one or more of the plurality of hollow cells 125 corresponding to the damaged area 111. For example, the one or more channels 126 can penetrate at least one of the plurality of hollow cells 125. The one or more channels 126 can define a repair cavity 160 corresponding to the damaged area 111. As illustrated in FIG. 13, only a portion of the core 120 is removed from the damaged area 111 to define the repair cavity. Accordingly, creating a repair cavity 160 in the composite structure 100 can include removing only a portion of the core 120 from the damaged area 111 to create the repair cavity 160. Removing portions of the composite structure 100 through the one or more access holes 302 to create the repair cavity 160 can include using a foamable media injection tube 701 to create one or more channels 126 within the core 120 to create the repair cavity 160, and the repair cavity 160 can include only a portion of the core 120 within the damaged area 111.

As illustrated in FIG. 13, using a foamable media injection tube 701 to create one or more channels 126 within the core 120 to create the repair cavity 160 can include inserting the foamable media injection tube 701 into the core 120 through the one or more access holes 302. The foamable media injection tube 701 can include a tube-guidable cutter configured to move in and out and rotated to various positions to create the one or more channels 126. The foamable media injection tube 701 can be configured to apply a vacuum to remove at least one of dust, debris, or contaminants from the one or more channels 126. In other implementations, portions of the core 120 cut by the foamable media injection tube 701 are left within the repair cavity 160 to mix and provide additional reinforcement to the foamable media 200 injected into the one or more channels 126. In some implementations, the foamable media 200 can be injected simultaneously as the one or more channels 126 are created.

Figure 16:
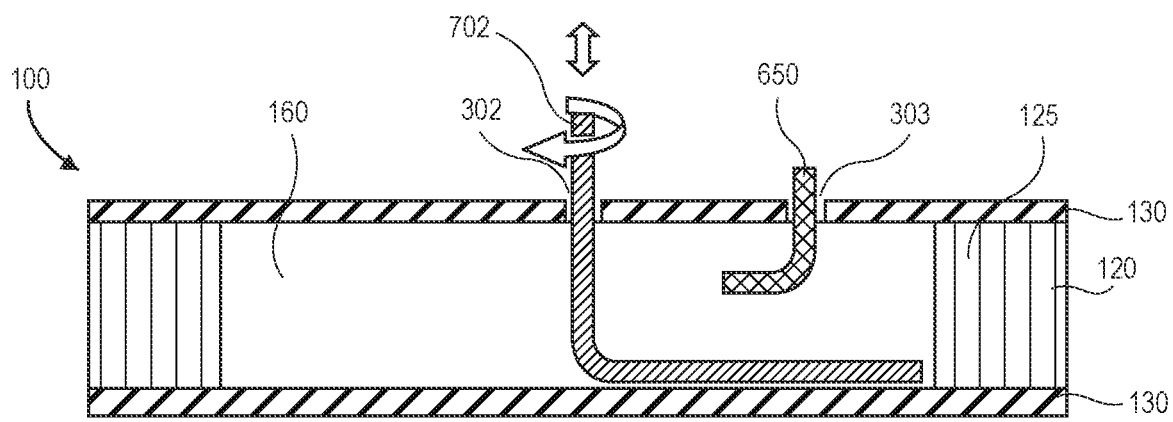

As illustrated in FIG. 16, the tool 700 can be a rotating chopping tool 702. The rotating chopping tool 702 can be inserted through the access hole 302 to create a repair cavity 160 within the core 120. The repair cavity 160 can correspond to the damaged area 111. For example, the rotating chopping tool 702 can include a cutter on a drill motor configured to slice or chop portions of the core 120 within the damaged area 111 to define the repair cavity 160. The rotating chopping tool 702 can be configured to apply a vacuum to remove at least one of dust, debris, or contaminants from the one or more channels 126. In other implementations, portions of the core 120 cut by the rotating chopping tool 702 are left within the repair cavity 160 to mix and provide additional reinforcement to the foamable media 200 placed in the repair cavity 160. Accordingly, removing portions of the composite structure 100 through the one or more access holes 302 to create the repair cavity 160 can include using a rotating chopping tool 702 to create the repair cavity 160. In some implementations, the repair cavity 160 corresponds to the entire portion of the core 120 within the damaged area 111.

Creating a repair cavity 160 in the composite structure 100 can include removing at least one of dust, debris, or contaminants from the repair cavity 160. At least one of the one or more access holes 302 and/or the one or more vent holes 303 can be used to remove the at least one of dust, debris, or contaminants from the repair cavity 160. For example, as illustrated in FIGS. 13 and 16, a vacuum tool can be inserted through the vent hole 303 to remove the at least one of dust, debris, or contaminants from the repair cavity 160. In some implementations, water is removed from the repair cavity 160 when creating the repair cavity 160. For example, contaminants, such as water, can be removed by suction and/or evaporation through at least one of the one or more access holes 302 and/or the one or more vent holes 303. The evaporation can be promoted by internal or external heat application. Accordingly, in some implementations, the repair cavity 160 is substantially free of water.

Operation 920 include placing foamable media 200 in the repair cavity 160. Placing foamable media 200 in the repair cavity 160 can include placing foamable media 200 in the repair cavity 160 through at least one of the one or more access holes 302 and/or the one or more vent holes 303.

For example, as illustrated in FIG. 13, the foamable media injection tube 701 can be used to inject foamable media 200 into the one or more channels 126 within the core 120. The foamable media 200 can be injected into the plurality of hollow cells 125 breached by the one or more channels 126. In some implementations, the foamable media 200 is injected simultaneously with the creation of the one or more channels 126. In other implementations, the foamable media 200 is injected after the creation of the one or more channels 126.

The foamable media 200 can include one or more layers of foamable media 200. Accordingly, placing foamable media 200 in the repair cavity 160 can include placing two or more layers of foamable media 200 in the repair cavity 160. At least one of the two or more layers of foamable media 200 can have a different functional characteristic than the rest of the two or more layers of foamable media 200.

Expanding the foamable media 200 placed in the repair cavity 160 can include applying the predetermined change in condition or triggering event to the foamable media 200. For example, the foamable media 200 can be activated and cured chemically or thermally to expand the foamable media 200 with the repair cavity 160. The foamable media 200 can be activated using a heat blanket or induction heating.

Figure 14:
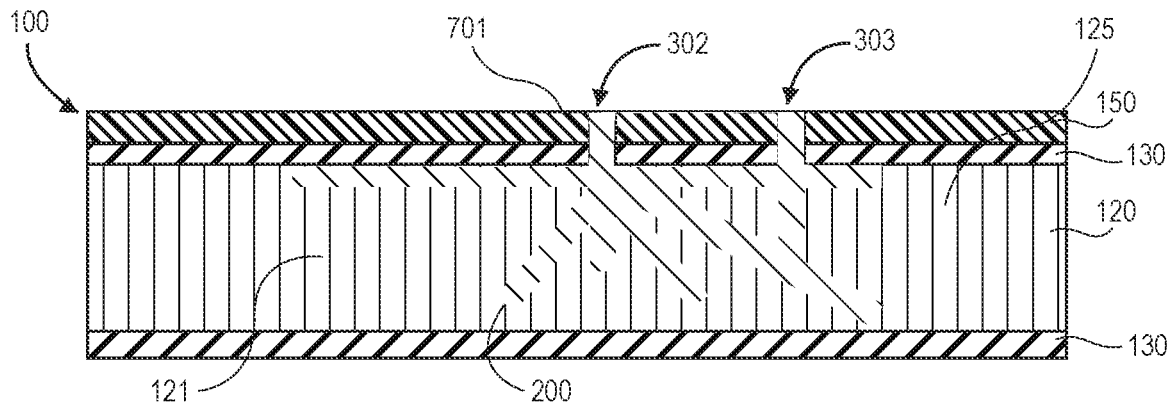

Expanding the foamable media 200 placed in the repair cavity 160 can include applying a vacuum to the foamable media 200 through at least one of the one or more access holes 302 and/or the one or more vent holes 303 to expand the foamable media 200. The foamable media 200 can expand into substantially all areas of the repair cavity 160. For example, as illustrated in FIGS. 13-14, expanding the foamable media 200 placed in the repair cavity 160 can include expanding the foamable media 200 into one or more damaged and/or crushed cells 121 of the core 120 and at least partially restoring a shape or volume of the one or more damaged and/or crushed cells 121 when expanded. Expanding the foamable media 200 placed in the repair cavity 160 can include solidifying or curing the foamable media 200.

The foamable media 200 can be selected according to characteristics of the composite structure 100 and/or the core 120. For example, the foamable media 200 can be selected to match at least one of a stiffness, thermal expansion coefficient, rigidity, impact resistance, or combinations thereof, of the composite structure 100 and/or the core 120. The foamable media 200 can also be selected according to a material compatibility with the composite structure 100 and/or the core 120.

In some implementations, the external skin 150 maintains the foamable media 200 within the repair cavity 160 during an expansion and solidifying or curing process of the foamable media 200. Accordingly, expanding the foamable media 200 placed in the repair cavity 160 can include sealing the one or more access holes 302 and/or the one or more vent holes 303 to apply a pressure on the foamable media 200 during expansion.

Figure 17:
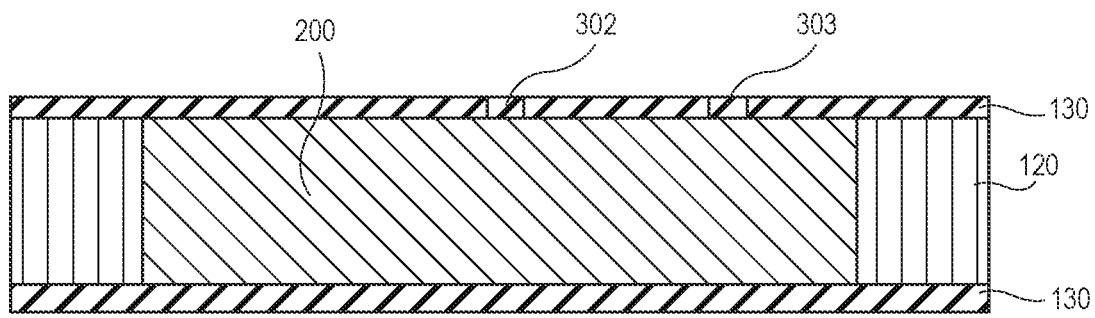

Method 900 can further include removing excess foamable media 200 and sealing the composite structure 100 in operation 940. Removing excess foamable media 200 and sealing the composite structure 100 can include removing foamable media 200 expanded outside of the repair cavity 160. For example, foamable media expanded through the one or more access holes 302 and/or the one or more vent holes 303. As illustrated in FIGS. 14 and 17, removing excess foamable media 200 and sealing the composite structure 100 can include sealing the one or more access holes 302 and/or the one or more vent holes 303. For example, the one or more access holes 302 and/or the one or more vent holes 303 can be sealed using adhesive, sealant, plugs coated in adhesive, small adhesive-backed patches, and the like. Sealing the composite structure 100 can include re-applying an external finish or coating applied on the composite structure 100, such as a conductive coating, an external paint coating, a resin coating, and the like.

The methods described herein provide an ability of the foamable media 200 to accommodate irregular or complex shapes of the repair cavity 160. The repair cavity 160 is naturally and substantially filled by the foamable media 200 during expansion, including within damage cells of a honeycomb core. Further, significantly less preparation time is needed to prepare the repair cavity 160 to receive the foamable media 200, and repairs can be made faster and easier than conventional methods, such as scarf repairs. For example, the foamable media 200 can be implemented as an easily portable repair kit. In addition, some implementations of the present disclosure, such as method 900, allow repairs of composite structures 100 without the need to remove an external skin 150. The foamable media 200 can be inserted, activated, and cured where the composite structure 100 is located without need to remove or relocate it.

Figure 18:
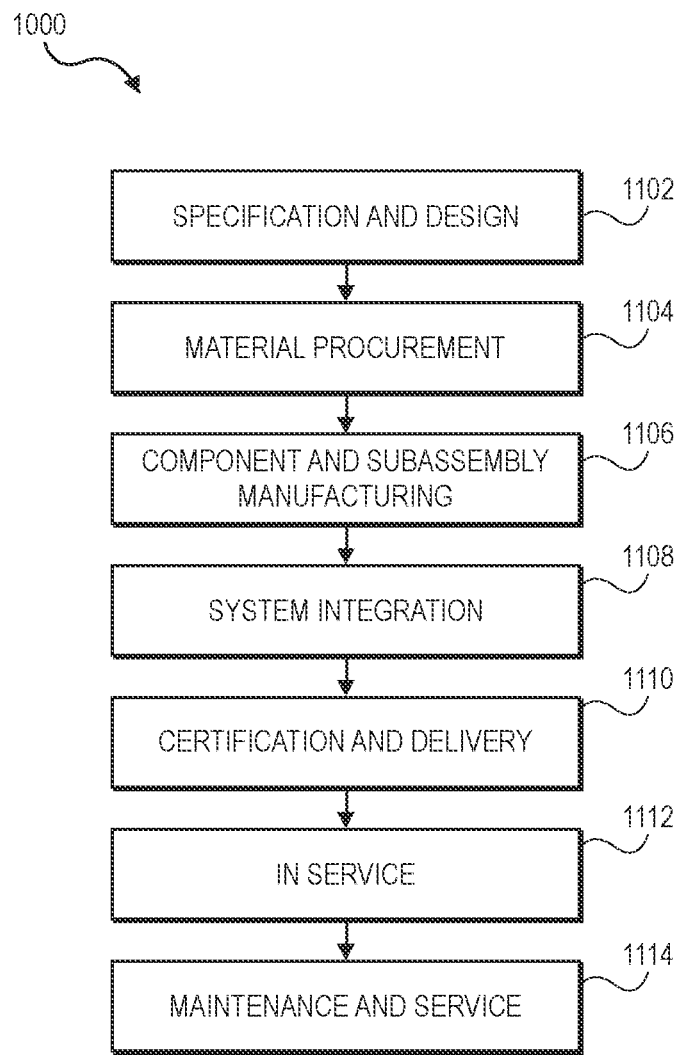
FIG. 18 illustrates a flow diagram of aircraft production and service methodology.
Figure 19:
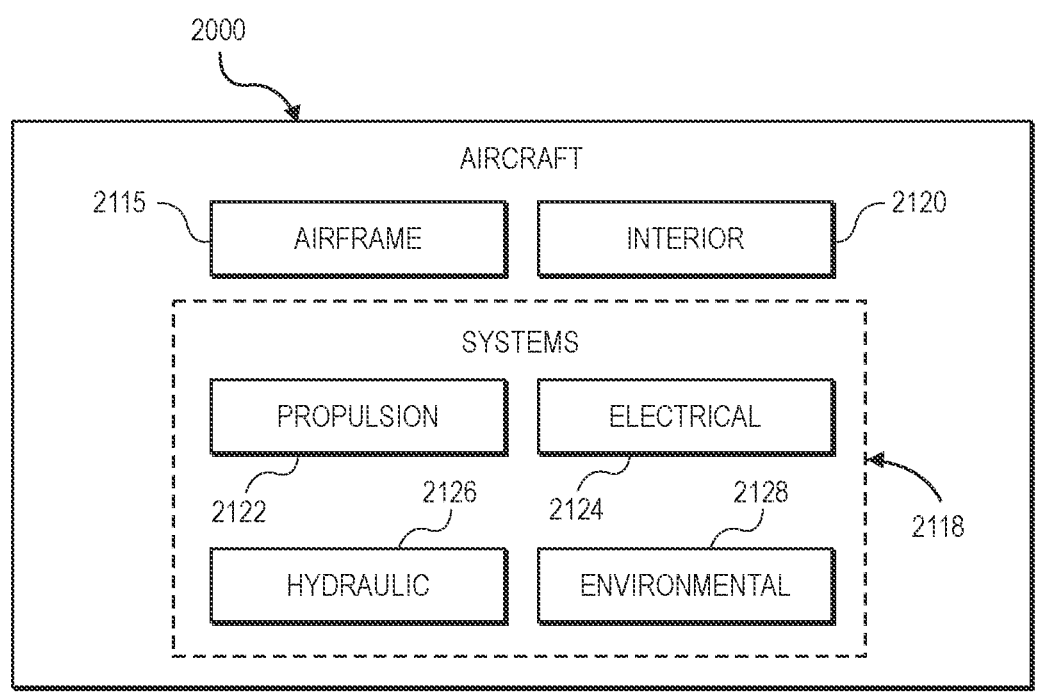
FIG. 19 illustrates a block diagram of an aircraft.

Implementations of the present disclosure may find use in a variety of potential applications, particularly in the transportation industry, including for example, aerospace, marine, automotive applications, and other application where repair of composite structures, such as composite laminate structures or composite sandwich panels, is desired. Thus, referring now to FIGS. 18 and 19, implementations of the disclosure may be used in the context of an aircraft manufacturing and service method 1000 as shown in FIG. 18 and an aircraft 2000 as shown in FIG. 19. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to component and subassembly manufacturing 1106 may be fabricated or manufactured in a manner similar to components or subassemblies produced while the aircraft 2000 is in service. Also, one or more apparatus examples, method examples, or a combination thereof may be utilized during component and subassembly manufacturing 1106 and system integration 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 18 and 19 describe the disclosure with respect to aircraft and aircraft manufacturing and servicing, the present disclosure is not limited thereto. The systems and methods of the present disclosure may also be used for spacecraft, satellites, submarines, surface ships, automobiles, tanks, trucks, power plants, and any other suitable type of objects.

The present disclosure has been described with reference to exemplary implementations. Although a few implementations have been shown and described, it will be appreciated by those skilled in the art that changes can be made in these implementations without departing from the principles and spirit of preceding detailed description. It is intended that the present disclosure be construed as including all such modifications and alterations insofar as they come within the scope of the appended claims or the equivalents thereof

What is claimed, is:

1. A method for repairing a composite structure, comprising:
   creating a repair cavity in a composite structure;
   placing foamable media in the repair cavity;
   placing a replacement skin over the repair cavity; and
   expanding the foamable media placed in the repair cavity,
   wherein the foamable media comprises a polymer matrix configured to hold a foaming agent, wherein the polymer matrix comprises one or more of a thermoset polymer, a thermoplastic polymer, or combinations thereof, wherein the foaming agent comprises one or more of a physical foaming agent, a chemical foaming agent, or combinations thereof, and wherein the foamable media is configured to expand according to a predetermined change in condition or triggering event,
   wherein the foamable media comprises a flexible film, and
   wherein the flexible film is adhesive and configured to bond the foamable media to at least one of the repair cavity and the replacement skin.

2. The method of claim 1, further comprising at least one of: placing a caul plate over the repair cavity, removing excess foamable media, and sealing the composite structure.

3. The method of claim 1, wherein creating a repair cavity in a composite structure comprises:
   detecting a damaged area in the composite structure;
   removing at least a portion of an external skin corresponding to the damaged area in the composite structure; and removing material from the composite structure corresponding to the damaged area to define the repair cavity,
wherein removing material from the composite structure comprises removing at least one of dust, debris, or contaminants from the repair cavity.

4. The method of claim 3, further comprising placing a caul plate over the repair cavity, wherein placing a replacement skin over the repair cavity comprises bonding the replacement skin to the external skin, and wherein expanding the foamable media placed in the repair cavity comprises using at least one of the replacement skin and the caul plate to apply a pressure on the foamable media during expansion.

5. The method of claim 1, wherein the foamable media comprises at least one of a plurality of expandable pellets comprising the polymer matrix holding the foaming agent or a wet foam comprising a multi-part system that is mixed together to activate foaming and expand, each of the at least one of a plurality of expandable pellets encapsulated by the flexible film, and,
wherein the foamable media comprises reinforcing fibers comprising at least one of carbon fibers, fiberglass fibers, aramid fibers, polyester fibers, hemp fibers, wood fibers, or combinations thereof.

6. The method of claim 1, wherein the foamable media comprises two or more foamable media, and wherein placing foamable media in the repair cavity comprises placing two or more foamable media in the repair cavity.

7. The method of claim 1, wherein the foamable media comprises two or more layers of foamable media, and wherein placing foamable media in the repair cavity comprises placing two or more layers of foamable media in the repair cavity.

8. The method of claim 7, wherein placing foamable media in the repair cavity further comprises placing one or more septum in the repair cavity, wherein at least one of the one or more septum is placed between the two or more layers of foamable media.

9. The method of claim 7, wherein at least one of the two or more layers of foamable media has a different functional characteristic than the rest of the two or more layers of foamable media.

10. The method of claim 1, wherein placing foamable media in the repair cavity comprises placing one or more adhesive layers in the repair cavity, wherein the one or more adhesive layers bond the foamable media to at least one of the repair cavity or the replacement skin, and wherein the one or more adhesive layers comprise at least one of an epoxy resin, an epoxy film, a paste, a glue, a plastic film, or combinations thereof.

11. A method for repairing a composite structure, comprising:
creating a repair cavity in a composite structure;
placing foamable media in the repair cavity;
placing a replacement skin over the repair cavity; and
expanding the foamable media placed in the repair cavity,
wherein the foamable media comprises a polymer matrix configured to hold a foaming agent, wherein the polymer matrix comprises one or more of a thermoset polymer, a thermoplastic polymer, or combinations thereof, wherein the foaming agent comprises one or more of a physical foaming agent, a chemical foaming agent, or combinations thereof, and wherein the foamable media is configured to expand according to a predetermined change in condition or triggering event,
wherein the foamable media comprises two or more foamable media, and wherein placing foamable media in the repair cavity comprises placing two or more foamable media in the repair cavity, and
wherein at least one of the two or more foamable media comprises a flexible film, wherein the flexible film is adhesive and configured to bond the two or more foamable media together, and wherein the flexible film comprises at least one of a thermoplastic elastomers (TPE), silicon, natural rubber, natural or synthetic latex, polyethylene (PE), or combinations thereof.

12. The method of claim 11, wherein placing foamable media in the repair cavity further comprises placing one or more septum in the repair cavity, and wherein at least one of the one or more septum is placed between the two or more foamable media.

13. The method of claim 12, wherein placing foamable media in the repair cavity comprises placing one or more adhesive layers between the two or more foamable media and the one or more septum.

14. The method of claim 11, wherein at least one of the two or more foamable media has a different functional characteristic than the rest of the two or more foamable media.

15. The method of claim 11, wherein placing foamable media in the repair cavity comprising placing one or more adhesive layers between the two or more foamable media.

16. A method for repairing a composite structure comprises:
creating a repair cavity in the composite structure, including chopping or slicing at least a portion of the composite structure to define the repair cavity;
placing foamable media in the repair cavity; and
expanding the foamable media placed in the repair cavity into substantially all areas of the repair cavity, such that the repair cavity consists essentially of the expanded foamable media and the chopped or sliced portions of the composite structure providing additional reinforcement to the foamable media,
wherein the composite structure comprises a composite sandwich panel including a core disposed between two face sheets, and wherein the core defines a plurality of hollow cells, and
wherein the foamable media comprises a polymer matrix configured to hold a foaming agent, wherein the polymer matrix comprises one or more of a thermoset polymer, a thermoplastic polymer, or combinations thereof, wherein the foaming agent comprises one or more of a physical foaming agent, a chemical foaming agent, or combinations thereof, and wherein the foamable media is configured to expand according to a predetermined change in condition or triggering event.

17. The method of claim 16, further comprising removing excess foamable media and sealing the composite structure.

18. The method of claim 17, wherein creating a repair cavity in the composite structure comprises:
detecting a damaged area in the composite structure;
creating one or more access holes and one or more vent holes in the composite structure; and
chopping or slicing at least the portion of the composite structure through the one or more access holes or the one or more vent holes to create the repair cavity,
where the repair cavity is created without the need to remove a substantial portion an external skin of the composite structure corresponding to the damaged area in the composite structure.

19. The method of claim 18, wherein placing foamable media in the repair cavity comprises placing two or more layers of foamable media in the repair cavity, and wherein at least one of the two or more layers of foamable media has a different functional characteristic than the rest of the two or more layers of foamable media.

20. The method of claim 18, wherein removing portions of the composite structure through the one or more access holes or the one or more vent holes to create the repair cavity comprises inserting a foamable media injection tube into the core through the one or more access holes to create one or more channels within the core, and wherein the one or more channels penetrate at least one of the plurality of hollow cells.

* * * * *